US008281015B2

(12) United States Patent
Jia et al.

(10) Patent No.: US 8,281,015 B2
(45) Date of Patent: Oct. 2, 2012

(54) AUTOMATIC DETECTION AND ESTABLISHMENT OF NETWORK CONNECTION

(75) Inventors: Lujun R. Jia, Foxboro, MA (US); Andrew F. Patka, Holliston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 532 days.

(21) Appl. No.: 11/617,996

(22) Filed: Dec. 29, 2006

(65) Prior Publication Data
US 2008/0162702 A1 Jul. 3, 2008

(51) Int. Cl.
*G06F 15/16* (2006.01)
(52) U.S. Cl. ......... 709/227; 709/220; 709/226; 709/245
(58) Field of Classification Search .................. 709/220, 709/227, 226, 245
See application file for complete search history.

(56) References Cited

U.S. PATENT DOCUMENTS

| 6,560,648 | B1 * | 5/2003 | Dunn et al. | 709/224 |
|---|---|---|---|---|
| 6,957,276 | B1 * | 10/2005 | Bahl | 709/245 |
| 6,958,996 | B2 * | 10/2005 | Xiong | 370/389 |
| 2003/0069947 | A1 * | 4/2003 | Lipinski | 709/220 |
| 2003/0069992 | A1 * | 4/2003 | Ramig | 709/245 |
| 2004/0078708 | A1 * | 4/2004 | Li et al. | 714/43 |
| 2004/0114610 | A1 * | 6/2004 | Featherston et al. | 370/401 |
| 2005/0015644 | A1 * | 1/2005 | Chu et al. | 714/4 |
| 2005/0102406 | A1 * | 5/2005 | Moon | 709/228 |
| 2006/0250982 | A1 * | 11/2006 | Yuan et al. | 370/254 |

OTHER PUBLICATIONS

Droms, R., "Dynamic Host Configuration Protocol", Network Working Group, Request for Comments: 2131, Mar. 1997.
Mamakos, et al., "A Method for Transmitting PPP Over Ethernet (PPPoE)", Network Working Group, Request for Comments: 2516, Feb. 1999.

* cited by examiner

*Primary Examiner* — Yves Dalencourt

(57) ABSTRACT

A device attempts to establish a dynamic host configuration protocol (DHCP) connection and attempts to establish a point-to-point protocol over Ethernet (PPPoE) connection when the attempt to establish the DHCP connection is unsuccessful. The device establishes the DHCP connection when the attempt to establish the DHCP connection is successful, or establishes the PPPoE connection when the attempt to establish the PPPoE connection is successful.

24 Claims, 6 Drawing Sheets

AUTOMATIC DETECTION AND ESTABLISHMENT OF NETWORK CONNECTION

BACKGROUND

There has been a recent trend to change connections to broadband customer premises equipment from a point-to-point protocol over Ethernet (PPPoE) to a dynamic host configuration protocol (DHCP) in order to access features and management capabilities provided by DHCP functionality. Typically, the customer premises equipment is configured to establish either a PPPoE connection or a DHCP connection. This may cause unnecessary delay and frustration when the customer premises equipment attempts to acquire a network connection using an unavailable protocol.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may facilitate automatic detection and establishment of a network connection, such as a DHCP connection or PPPoE connection. In one implementation, DHCP and PPPoE connections may be alternatively attempted for a predetermined number of rounds.

Figure 1:
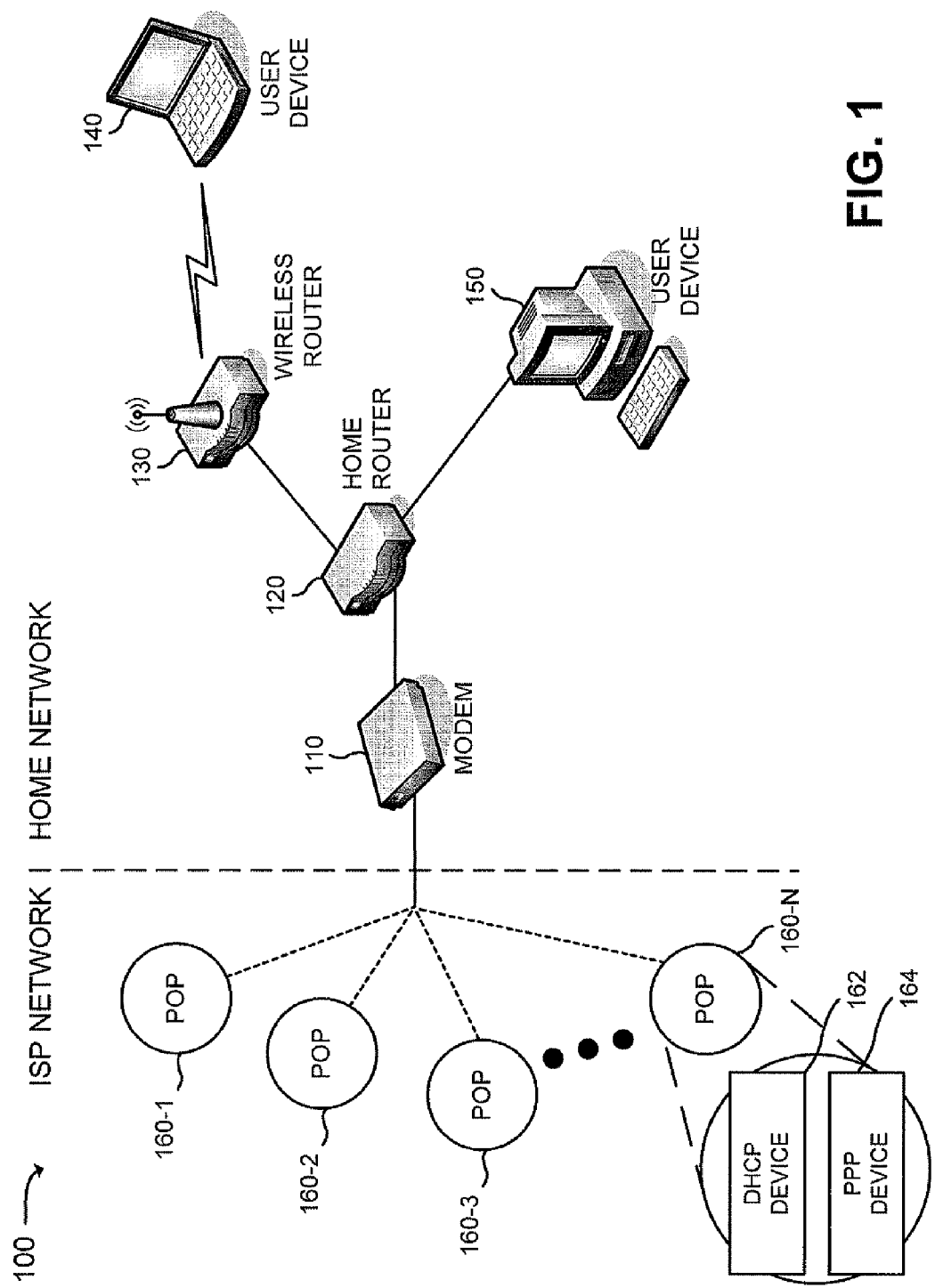
FIG. 1 is an exemplary diagram of a network in which systems and methods described herein may be implemented.

FIG. 1 is an exemplary diagram of a network 100 in which systems and methods described herein may be implemented. Network 100 may include a home network and an Internet service provider (ISP) network. The home network may include a modem 110, a home router 120, a wireless router 130, and user devices 140 and 150. In practice, the home network may include more, fewer, or different devices than are shown in FIG. 1. Also, two or more of these devices may be implemented within a single device, or a single device may be implemented as multiple, distributed devices. For example, modem 110, home router 120, and/or wireless router 130 may be implemented as a single device.

Modem 110 may include a network device, such as a cable modem, a DSL modem, a dial-up modem, or another type of modem, that processes data received on an external link (e.g., on the ISP network side) for transmission on a local link (e.g., on the home network side), and vice versa.

Home router 120 may include a network device that may provide connectivity between the ISP network and the home network. Home router 120 may obtain configuration information, such as a network address and/or one or more configuration parameters, from the ISP network. Home router 120 may also provide firewall functionality for the home network, such as packet filtering and protection against network attacks.

Wireless router 130 may include a network device that may provide wireless connectivity within the home network. For example, wireless router 130 may permit a wireless user device to connect to the home network and/or gain access outside of the home network.

User devices 140 and 150 may include any type or form of computation or communication device, such as a personal computer, a laptop, a personal digital assistant (PDA), etc. A user of user device 140/150 may utilize user device 140/150 to gain access outside of the home network, such as to gain access to a wide area network (e.g., the Internet).

The ISP network may include a number of points-of-presence (POPs) 160-1, . . . 160-N (collectively referred to as "POPs 160"). A POP 160 may include one or more devices that may function as an access point to a network, such as the Internet. In one implementation, a POP 160 may support DHCP functionality, PPP functionality, or a combination of DHCP and PPP functionality. As shown in FIG. 1, POP 160 may include a DHCP device 162 and/or a PPP device 164. In practice, POP 160 may include other devices not shown in FIG. 1.

DHCP device 162 may include a DHCP server that may maintain a pool of addresses available for assignment. DHCP device 162 may provide a unique IP address and other configuration parameters that a requesting device may need to communicate with a network using DHCP. DHCP device 162 may set a length of time, called a lease, for which a provided IP address is valid. DHCP device 162 may ensure that all IP addresses are unique (i.e., no IP address is assigned to a second device while the first device's assignment is valid (e.g., its lease has not expired)).

PPP device 164 may include an access concentrator that may facilitate the connection of a group of modems to a network, such as the Internet. PPP device 164 may communicate with a requesting device to establish a point-to-point connection using PPPoE. PPP device 164 may establish a connection between two Ethernet ports that can then be used to transport IP packets based on the features of PPP.

Figure 2:
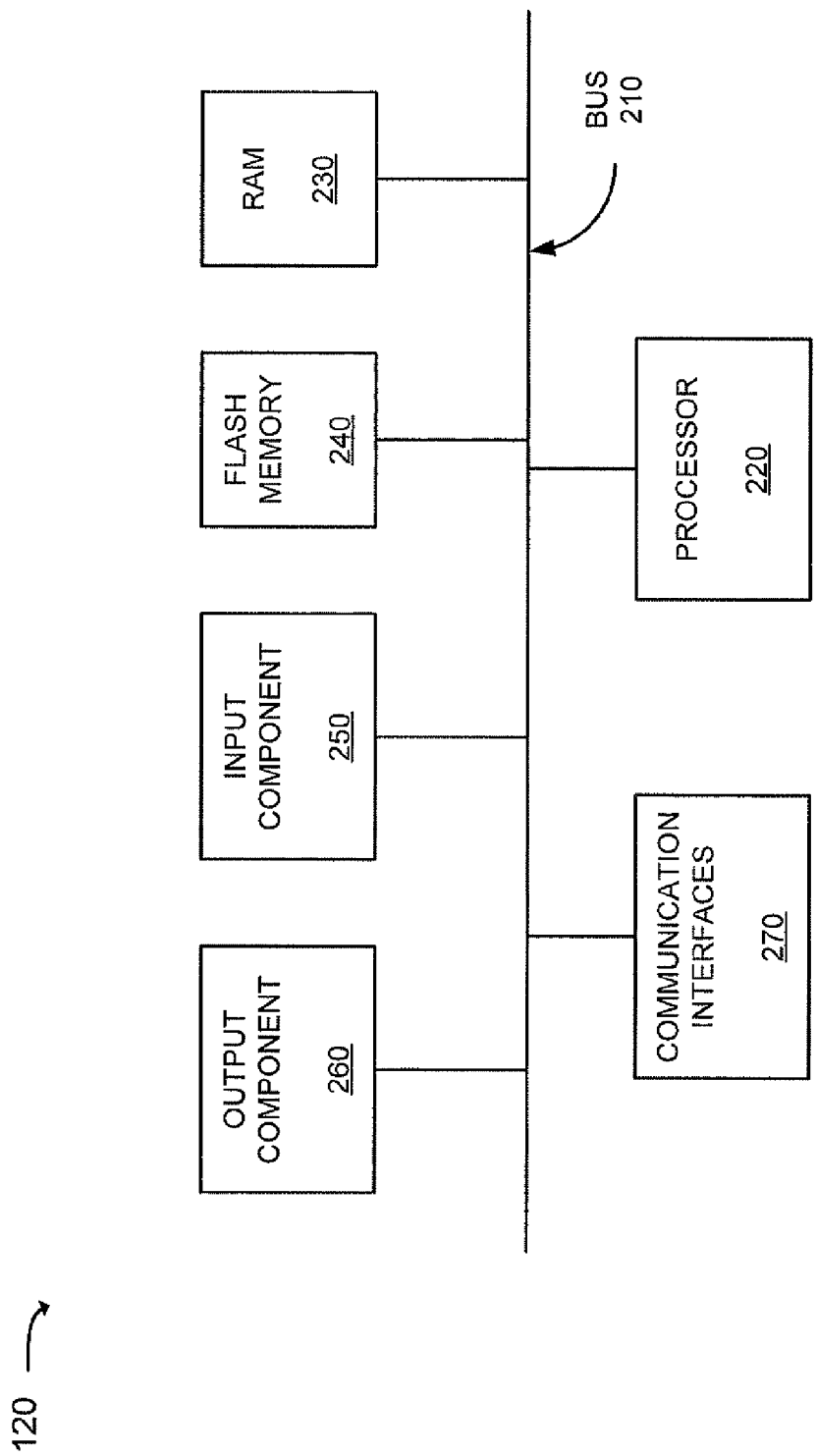
FIG. 2 is an exemplary diagram of components of a device that may correspond to the home router and/or the modem of FIG. 1.

FIG. 2 is an exemplary diagram of components of a device that may correspond to home router 120 and/or modem 110. Device 300 may include a bus 210, a processor 220, a random access memory (RAM) 230, a flash memory 240, an input component 250, an output component 260, and communication interfaces 270. Bus 210 may include a path that permits communication among the elements of Device 300.

Processor 220 may include a processor, microprocessor, or processing logic that may interpret and execute instructions. RAM 230 may include any type of dynamic storage device that may store information and instructions for execution by processor 220. Flash memory 240 may include any type of non-volatile storage device that may store information for use by processor 220.

Input component 250 may include a mechanism that permits an operator to input information to device 300, such as a button, switch, input key, etc. Output component 260 may include a mechanism that outputs information to the operator, such as a display, one or more light emitting diodes (LEDs), a speaker, etc. Communication interfaces 270 may include any transceiver-like mechanisms that enable device 300 to communicate with other devices and/or systems. For example, communication interfaces 270 may include one or more Ethernet interfaces, optical interfaces, coaxial interfaces, or the like.

As will be described in detail below, home router 120 may perform certain operations relating to the automatic detection and establishment of a network connection. Home router 120 may perform these operations in response to processor 220 executing software instructions contained in a computer-readable medium, such as RAM 230. A computer-readable medium may be defined as a physical or logical memory device and/or carrier wave.

The software instructions may be read into RAM 230 from another computer-readable medium, such as flash memory 240, or from another device via communication interfaces 270. The software instructions contained in RAM 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Home router 120 may have a user-configurable parameter that instructs home router 120 to use DHCP only, PPPoE only, or automatic detection when acquiring a network connection. FIGS. 3-6 depict a flowchart of a process for acquiring a network connection. In one implementation, the process of FIGS. 3-6 may be performed by one or more software and/or hardware components within home router 120, modem 110, or a combination of home router 120 and modem 110. The process of FIGS. 3-6 may begin upon initialization of home router 120, such as when home router 120 powers up, reboots, loses network connection, or otherwise needs to be configured for access to a network, such as the Internet.

Figure 3:
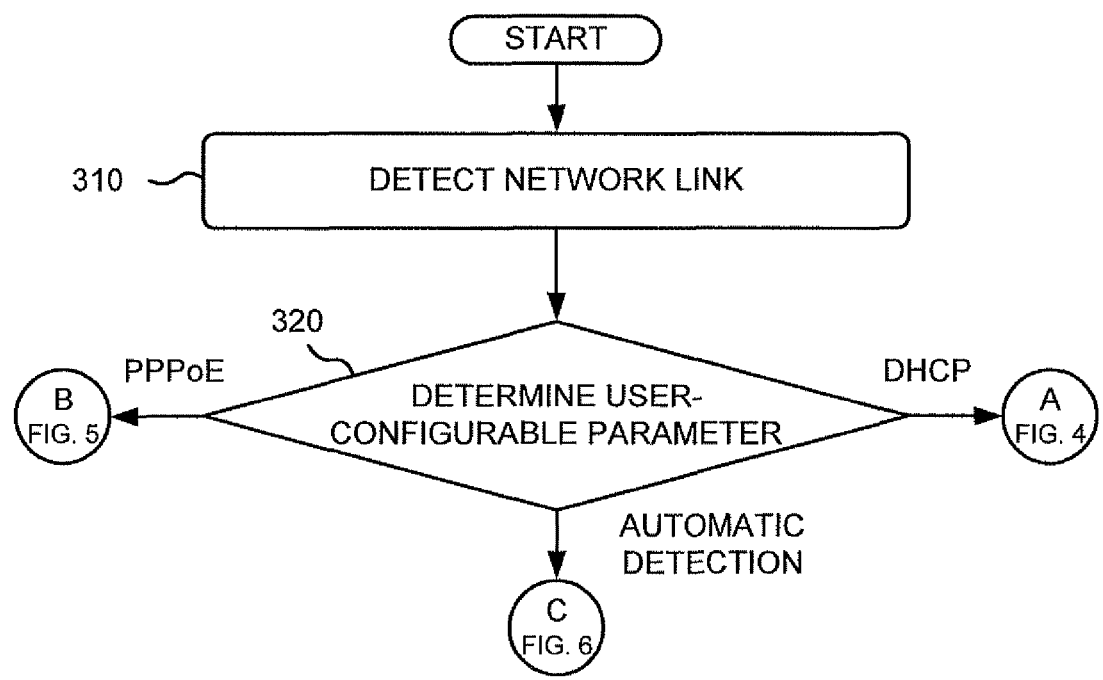
FIGS. 3-6 depict a flowchart of an exemplary process for acquiring a network connection.

A network link may be detected (block 310) (FIG. 3). For example, home router 120 may detect that an active network link is connected to one of its ports. A value of the user-configurable parameter may be determined (block 320). For example, home router 120 may store the user-configurable parameter in a predetermined location and may determine the value stored in this location. If the user-configurable parameter indicates that DHCP is to be used to acquire the network connection, then the process of FIG. 4 may be performed. If the user-configurable parameter indicates that PPPoE is to be used to acquire the network connection, then the process of FIG. 5 may be performed. If the user-configurable parameter indicates that automatic detection is to be used to acquire the network connection, then the process of FIG. 6 may be performed.

Figure 4:
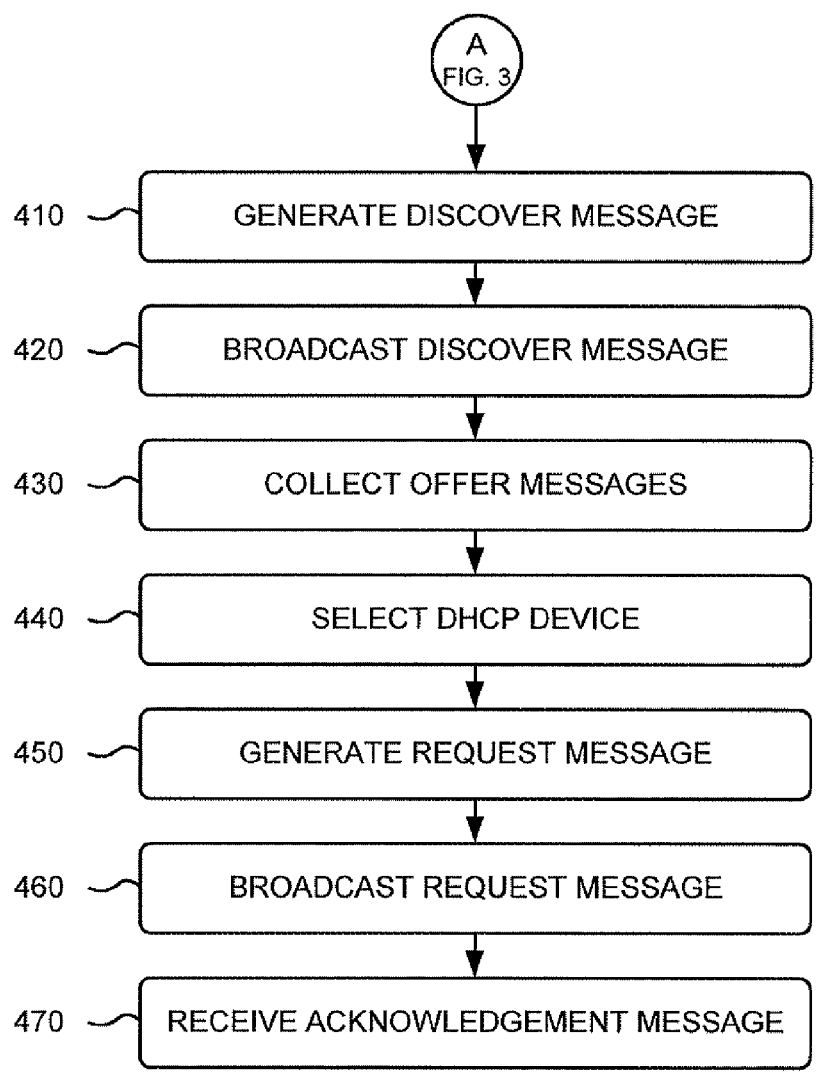

If DHCP is to be used to acquire the network connection, a discover message may be generated and broadcast (blocks 410 and 420) (FIG. 4). For example, home router 120 may generate a discover message that indicates that home router 120 desires to be configured for network access. Home router 120 may broadcast the discover message to a predetermined broadcast address. The discover message may include options that suggest values for the network address and lease duration. The discover message may be received by one or more DHCP devices 162 of one or more POPs 160.

Each DHCP device 162 may identify an available address from its address pool. DHCP devices 162 may respond with an offer message that includes an available network address and other configuration parameters. DHCP devices 162 may forward the offer messages to a hardware address associated with home router 120.

Offer messages may be collected (block 430). For example, home router 120 may receive one or more offer messages from one or more DHCP devices 162. In one implementation, home router 120 may collect offer messages received within a predetermined time period. Home router 120 may ignore any offer message received after the predetermined time period. If home router 120 receives no offer messages during the predetermined time period, home router 120 may retransmit the discover message.

A DHCP device 162 may be selected (block 440). For example, home router 120 may select one of the DHCP devices 162 from which home router 120 received an offer message. In one implementation, home router 120 may select a DHCP device 162 based on the configuration parameters provided in the offer message.

A request message may be generated and broadcast (blocks 450 and 460). The request message may identify the selected DHCP device 162 and may specify desired network address and/or one or more configuration parameters. In one implementation, home router 120 may broadcast the request message to the same broadcast address to which it sent the discover message.

DHCP devices 162 may receive the request message. A DHCP device 162 that was not selected by home router 120 may use the request message as notification that home router 120 declined its offer. A DHCP device 162 that was selected by home router 120 may store the network address and/or the one or more configuration parameters for home router 120 in persistent storage. The selected DHCP device 162 may generate an acknowledgement message that contains the network address, the configuration parameters for home router 120, and/or duration of the lease. DHCP device 162 may send the acknowledgement message to home router 120.

The acknowledgement message may be received (block 470). For example, home router 120 may receive the acknowledgement message and check the configuration parameters contained in the acknowledgement message. Home router 120 may also record the duration of the lease. At this point, home router 120 may be properly configured to communicate on the network.

Figure 5:
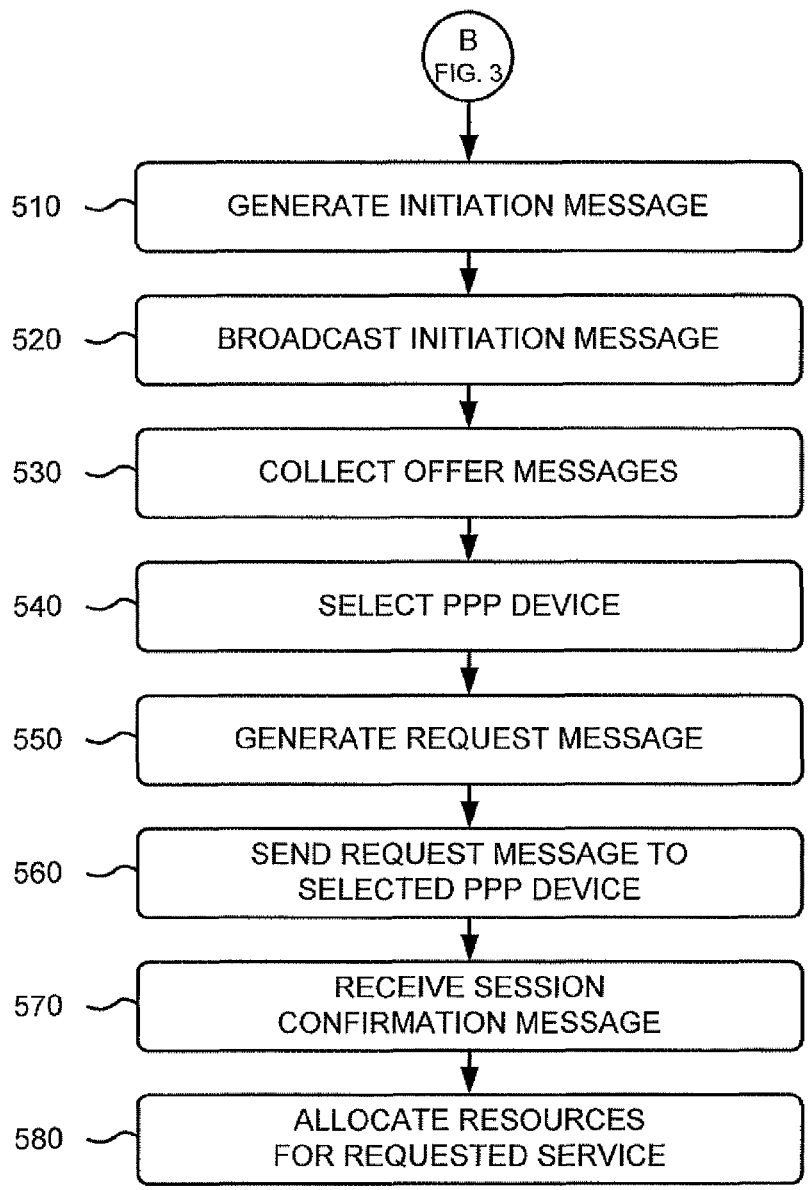

If PPPoE is to be used to acquire the network connection, a two-stage process may be performed, including a discovery stage followed by a session stage. During the discovery stage, an initiation message may be generated and broadcast (blocks 510 and 520) (FIG. 5). For example, home router 120 may generate an initiation message that may indicate that home router 120 desires to be configured for network access. The initiation message may identify a service that is being requested by home router 120 and a unicast address associated with home router 120. Home router 120 may broadcast the initiation message to a predetermined broadcast address.

The initiation message may be received by one or more PPP devices 164 of one or more POPs 160. If a PPP device 164 receives an initiation message that it can serve, PPP device 164 may generate an offer message. The offer message may identify the PPP device 164 and may identify the service requested by home router 120 and possibly one or more other services offered by PPP device 164. PPP device 164 may send the offer message to the unicast address associated with home router 120.

Because the initiation message was broadcast, home router 120 may receive offer messages from more than one PPP device 164. Offer messages may be collected (block 530). For example, home router 120 may collect offer messages received within a predetermined time period. Home router 120 may ignore any offer message received after the predetermined time period. If home router 120 receives no offer messages during the predetermined time period, home router 120 may retransmit the initiation message.

A PPP device 164 may be selected (block 540). For example, home router 120 may select one of the PPP devices 164 from which home router 120 received an offer message. In one implementation, home router 120 may select a PPP device 164 based on the name of the PPP device 164 and/or the service(s) being offered in the offer message.

A request message may be generated and sent to the selected PPP device 164 (blocks 550 and 560). The request message may identify the service requested by home router 120. Home router 120 may send the request message to the unicast address associated with the selected PPP device 164.

If the selected PPP device 164 receives the request message, the selected PPP device 164 may prepare to begin a PPP session. For example, the selected PPP device 164 may generate a unique session identifier for the PPP session and may include the session identifier in a session confirmation message. The session confirmation message may identify the service for which the selected PPP device 164 has accepted the PPP session. The selected PPP device 164 may send the session confirmation message to the unicast message associated with home router 120. The selected PPP device 164 may then enter the session stage.

The session confirmation message may be received (block 570). For example, home router 120 may receive the session confirmation message and may determine whether the service identified by the message matches the service requested by home router 120. If the service matches, home router 120 may enter the session stage.

During the session stage, resources may be allocated for the service (block 580). For example, home router 120 and the selected PPP device 164 may exchange PPP data with the appropriate PPP encapsulation to enable home router 120 to gain access to the network.

Figure 6:
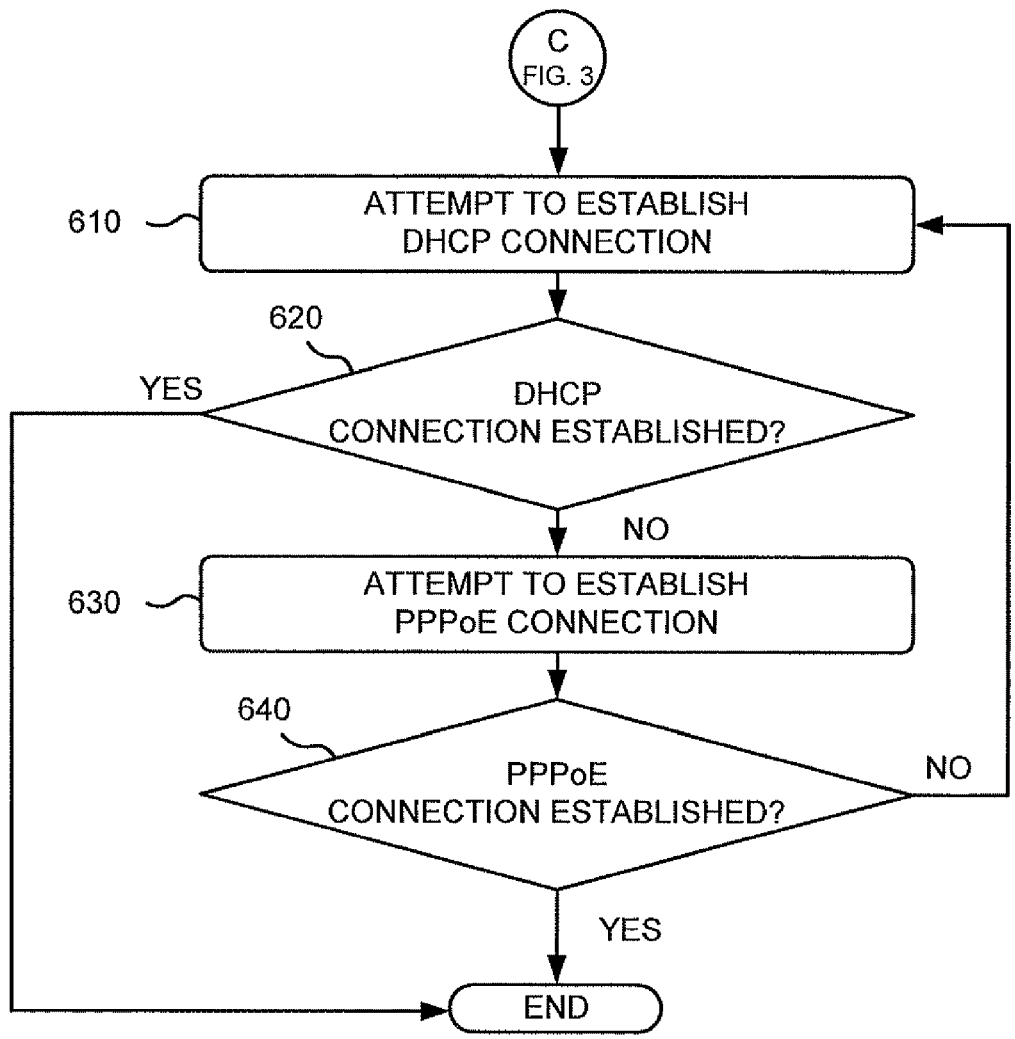

If automatic detection is to be used to acquire the network connection, an attempt may be made to establish a DHCP connection (block 610) (FIG. 6). For example, home router 120 may perform the DHCP establishing process described with regard to FIG. 4. It may be determined whether the DHCP connection was successfully established (block 620). For example, home router 120 may consider the DHCP connection successfully established after successful completion of the DHCP establishing process described with regard to FIG. 4 within a predetermined period of time. If the DHCP establishing process is not complete by the end of the predetermined period of time, then home router 120 may consider the connection attempt unsuccessful.

If the DHCP connection is not successfully established (block 620—NO), then an attempt may be made to establish a PPPoE connection (block 630). For example, home router 120 may perform the PPPoE establishing process described with regard to FIG. 5. It may be determined whether the PPPoE connection was successfully established (block 640). For example, home router 120 may consider the PPPoE connection successfully established after successful completion of the PPPoE establishing process described with regard to FIG. 5 within a predetermined period of time. If the PPPoE establishing process is not complete by the end of the predetermined period of time, then home router 120 may consider the connection attempt unsuccessful.

If the PPPoE connection is not successfully established (block 640—NO), then another attempt may be made to establish a DHCP connection (block 620). In one implementation, home router 120 may alternatively attempt DHCP and PPPoE connections for a predetermined number of rounds (e.g., two rounds). The predetermined number of rounds may be a user-configurable parameter. While home router 120 attempts a DHCP connection, home router 120 may not attempt a PPPoE connection. Similarly, while home router 120 attempts a PPPoE connection, home router 120 may not attempt a DHCP connection. If no connection (neither DHCP nor PPPoE) is established within the predetermined number of rounds, then home router 120 may declare the connection to be unattainable.

If the DHCP connection is successfully established (block 620—YES), then home router 120 may stop the PPPoE establishing process, if any, clear all states relating to the PPPoE establishing process, and ignore any PPPoE data that it may receive. If the PPPoE connection is successfully established (block 640—YES), then home router 120 may stop the DHCP establishing process, if any, clear all states relating to the DHCP establishing process, and ignore any DHCP data that it may receive.

If at any time during the automatic detection process the active network link is lost or closed, then home router 120 may return to block 610 and attempt to establish a DHCP connection if home router 120 detects that the network link becomes active again.

Implementations described herein may automatically determine the appropriate protocol to use to establish a network connection by, for example, alternatively attempting to achieve DHCP and PPPoE connections.

The foregoing description provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 3-6, the order of the acts may be modified in other implementations. Further, non-dependent acts may be performed in parallel.

Also, it has been described that the automatic detection process entails attempting to achieve a DHCP connection followed by a PPPoE connection. In an alternate implementation, the automatic detection process may entail attempting to achieve a PPPoE connection followed by a DHCP connection.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A network device, comprising:
   a processor configured to:
   detect a network link,
   alternatively and successively attempt, based on the detected network link, to establish a dynamic host configuration protocol (DHCP) connection or a point-to-point protocol over Ethernet (PPPoE) connection over the detected network link for a predetermined number of iterations,
   when the attempt to establish the DHCP connection is unsuccessful, the processor is configured to attempt to establish the PPPoE connection a first time independent of receiving a request to establish the PPPoE connection,
   when the attempt to establish the PPPoE connection the first time is unsuccessful, the processor is configured to attempt to establish the DHCP connection a second time, independent of receiving a request to establish the DHCP connection, when the attempt to establish the DHCP connection the second time is unsuccessful, the processor is configured to attempt to establish the PPPoE connection a second time independent of receiving a request to establish the PPPoE connection, and when the attempt to establish the PPPoE connection the second time is unsuccessful, the processor is configured to attempt to establish the DHCP connection a subsequent time independent of receiving a request to establish the DHCP connection, establish the DHCP connection when the attempt to establish the DHCP connection is successful, and establish the PPPoE connection when the attempt to establish the PPPoE connection is successful.

2. The network device of claim 1, wherein, when attempting to establish the DHCP connection, the processor is configured to perform a DHCP process to attempt to establish the DHCP connection, wherein, when attempting to establish the PPPoE connection the first time based on the attempt to establish the DHCP connection being unsuccessful, the processor is configured to perform a PPPoE process to attempt to establish the PPPoE connection based on the DHCP process being unsuccessful in establishing the DHCP connection, and wherein the processor is further configured to:
perform at least one other iteration of the DHCP process based on the PPPoE process to attempt to establish the PPPoE connection the first time being unsuccessful in establishing the PPPoE connection, and perform at least one other iteration of the PPPoE process, to attempt to establish the PPPoE connection the second time, based on the at least one other iteration of the DHCP process being unsuccessful in establishing the DHCP connection.

3. The network device of claim 1, wherein the predetermined number of iterations is user-configurable, and wherein the processor is further configured to:
receive input, from a user, corresponding to the predetermined number of iterations, and alternatively and successively attempt to establish the DHCP connection or the PPPoE connection over the detected network link for the predetermined number of iterations based on the received input.

4. The network device of claim 1, wherein the processor is further configured to determine whether the DHCP connection is successfully established by determining whether the DHCP connection is established within a time period.

5. The network device of claim 1, wherein the processor is further configured to determine whether the PPPoE connection is successfully established by determining whether the PPPoE connection is established within a time period.

6. The network device of claim 1, wherein, while attempting to establish the DHCP connection, the processor is configured to not attempt to establish the PPPoE connection.

7. The network device of claim 1, wherein, while attempting to establish the PPPoE connection, the processor is configured to not attempt to establish the DHCP connection.

8. The network device of claim 1, wherein the processor is further configured to determine that no connection is to be established over the detected network link when both the DHCP connection and the PPPoE connection are not established within the predetermined number of iterations.

9. The network device of claim 1, wherein, when the DHCP connection is established, the processor is configured to at least one of:
cease any attempt to establish the PPPoE connection,
clear any states relating to establishing the PPPoE connection, or
ignore any PPPoE data that is received.

10. The network device of claim 1, wherein, when the PPPoE connection is established, the processor is configured to at least one of:
cease any attempt to establish the DHCP connection,
clear any states relating to establishing the DHCP connection, or
ignore any DHCP data that is received.

11. The network device of claim 1, wherein, when detecting the network link, the processor is configured to detect an active network link connected to at least one of a plurality of ports associated with the network device, and wherein the processor is further configured to:
acquire a network connection based on a user-configurable parameter, where the user-configurable parameter is indicative of one of using only DHCP to acquire the network connection, using only PPPoE to acquire the network connection, or using automatic detection to acquire the network connection, wherein the processor is configured to alternatively and successively attempt to establish the DHCP connection or the PPPoE connection over the network link for the predetermined number of iterations, when the user-configurable parameter corresponds to a value indicative of using automatic detection to acquire the network connection, wherein the processor is configured to attempt to establish the DHCP connection over the detected network link without attempting to establish the PPPoE connection, when the user-configurable parameter corresponds to a value indicative of using only DHCP to acquire the network connection, and wherein the processor is configured to attempt to establish the PPPoE connection over the detected network link without attempting to establish the DHCP connection, when the parameter corresponds to a value indicative of using only PPoE to acquire the network connection.

12. A method, comprising:
receiving, by a device, a parameter associated with establishing a connection over a network link;
detecting, by the device, the network link;
determining, by the device and based on the detecting the network link, a value of the parameter;
alternatively attempting, by the device, to establish a dynamic host configuration protocol (DHCP) connection or a point-to-point protocol (PPP) connection over the network link for a predetermined number of iterations, when the determined value of the parameter indicates that automatic detection is to be used to establish a connection over the network link,
the alternatively attempting to establish the DHCP connection and the PPP connection comprising:
attempting to establish the PPP connection, based on determining that the attempt to establish the DHCP connection is unsuccessful and independent of receiving a request associated with establishing the PPP connection, and
attempting to establish the DHCP connection, based on determining that the attempt to establish the PPP connection is unsuccessful and independent of receiving a request associated with establishing the DCHP connection;
attempting, by the device, to establish the DHCP connection over the network link without attempting to establish the PPP connection, when the determined value of the parameter indicates that only the DHCP connection is to be established over the network link;
attempting, by the device, to establish the PPP connection over the network link without attempting to establish the DHCP connection, when the determined value of the parameter indicates that only the PPP connection is to be established over the network link;
establishing, by the device, the DHCP connection when the attempt to establish the DHCP connection is successful; and
establishing, by the device, the PPP connection when the attempt to establish the PPP connection is successful.

13. The method of claim 12, wherein attempting to establish the DHCP connection comprises performing a DHCP process to attempt to establish the DHCP connection,
wherein attempting to establish the PPP connection based on determining that the attempt to establish the DHCP connection is unsuccessful comprises performing a PPP process to attempt to establish the PPP connection based on the DHCP process being unsuccessful in establishing the DHCP connection,
the method further comprising:
performing at least one other iteration of the DHCP process based on determining that the PPP process, to attempt to establish the PPP connection based on the DHCP process being unsuccessful in establishing the DHCP connection, is unsuccessful in establishing the PPP connection, and
performing at least one other iteration of the PPP process based on determining that the at least one other iteration of the DHCP process is unsuccessful in establishing the DHCP connection.

14. The method of claim 12, wherein the predetermined number of iterations is user-configurable, and where the predetermined number of iterations is based on a first input received from a user,
the method further comprising:
receiving a second input, from the user, corresponding to another predetermined number of iterations;
detecting another network link; and
alternatively attempting to establish another DHCP connection and another PPP connection over the detected other network link for the other predetermined number of iterations.

15. The method of claim 12, further comprising:
determining whether the DHCP connection is established within a time period; and
determining that the DHCP connection is successfully established when the DHCP connection is established within the time period.

16. The method of claim 12, further comprising:
determining whether the PPP connection is established within a time period; and
determining that the PPP connection is successfully established when the PPP connection is established within the time period.

17. The method of claim 12, wherein, while attempting to establish the DHCP connection, no attempt is made to establish the PPP connection.

18. The method of claim 12, wherein, while attempting to establish the PPP connection, no attempt is made to establish the DHCP connection.

19. The method of claim 12, further comprising:
indicating that no connection is to be established over the network link when both the DHCP connection and the PPP connection are not established within the number of iterations.

20. The method of claim 12, further comprising, when the DHCP connection is established, at least one of:
ceasing any attempt to establish the PPP connection,
clearing any states relating to establishing the PPP connection, or
ignoring any PPP data that is received.

21. The method of claim 12, further comprising, when the PPP connection is established, at least one of:
ceasing any attempt to establish the DHCP connection,
clearing any states relating to establishing the DHCP connection, or
ignoring any DHCP data that is received.

22. A non-transitory computer-readable medium having one or more instructions stored thereon, the instructions, when executed by a processor of a device, cause the processor to perform a method comprising:
detecting a network link;
alternatively and successively attempting, based on the detected network link, to establish a dynamic host configuration protocol (DHCP) connection or a point-to-point protocol over Ethernet (PPPoE) connection over the detected network link,
the alternatively and successively attempting to establish the DHCP connection or the PPPoE connection over the detected network link including:
attempting to establish the PPPoE connection a first time, independent of receiving a request to establish the PPPoE connection, when the attempt to establish the DHCP connection is unsuccessful,
attempting to establish the DHCP connection a second time, independent of receiving a request to establish the DHCP connection, when the attempt to establish the PPPoE connection the first time is unsuccessful,
attempting to establish the PPPoE connection a second time, independent of receiving a request to establish the PPPoE connection, when the attempt to establish the DHCP connection the second time is unsuccessful, and
attempting to establish the DHCP connection a subsequent time, independent of receiving a request to establish the DHCP connection, when the attempt to establish the PPPoE connection the second time is unsuccessful;
establishing the DHCP connection when the attempt to establish the DHCP connection is successful; and
establishing the PPPoE connection when the attempt to establish the PPPoE connection is successful.

23. The non-transitory computer-readable medium of claim 22, where the method further comprises:
receiving a parameter associated with establishing a connection over the detected network link,
where the alternatively and successively attempting to establish the DHCP connection or the PPPoE connection over the detected network link includes:
alternatively and successively attempting to establish the DHCP connection or the PPPoE connection over the detected network link, when a value of the parameter indicates that automatic detection is to be used to establish a connection over the detected network link.

24. The non-transitory computer-readable medium of claim 23, where the method further comprises:
  attempting to establish the DHCP connection over the detected network link without attempting to establish the PPPoE connection, when the value of the parameter indicates that only the DHCP connection is to be established over the detected network link; and
  attempting to establish the PPPoE connection over the detected network link without attempting to establish the DHCP connection, when the value of the parameter indicates that only the PPPoE connection is to be established over the detected network link.

* * * * *